(12) United States Patent
Vora

(10) Patent No.: US 11,636,533 B1
(45) Date of Patent: Apr. 25, 2023

(54) INTERACTIVE SHOPPING SYSTEM AND METHOD

(71) Applicant: SWIFTGO, INC., Houston, TX (US)

(72) Inventor: Jigesh V. Vora, Houston, TX (US)

(73) Assignee: SwiftGo, Inc., Houston, TX (US)

( * ) Notice: Subject to any disclaimer, the term of this patent is extended or adjusted under 35 U.S.C. 154(b) by 0 days.

(21) Appl. No.: 17/354,564

(22) Filed: Jun. 22, 2021

Related U.S. Application Data

(63) Continuation of application No. 17/124,075, filed on Dec. 16, 2020, which is a continuation-in-part of application No. 14/952,718, filed on Nov. 25, 2015, now Pat. No. 10,915,936, which is a continuation-in-part of application No. 14/714,076, filed on May 15, 2015, now Pat. No. 9,230,249.

(60) Provisional application No. 62/139,404, filed on Mar. 27, 2015.

(51) Int. Cl.

| | |
|---|---|
| *G06Q 30/06* | (2012.01) |
| *G07G 1/00* | (2006.01) |
| *G07G 1/01* | (2006.01) |
| *G06Q 20/20* | (2012.01) |
| *G06Q 30/0601* | (2023.01) |

(52) U.S. Cl.
CPC ....... *G06Q 30/0641* (2013.01); *G06Q 20/208* (2013.01); *G07G 1/0081* (2013.01); *G07G 1/01* (2013.01)

(58) Field of Classification Search
None
See application file for complete search history.

(56) References Cited

U.S. PATENT DOCUMENTS

| | | |
|---|---|---|
| 6,484,939 B1 | 11/2002 | Blaeuer |
| 7,377,538 B2 * | 5/2008 | Stuart ..................... B62B 3/027 280/651 |
| 8,418,919 B1 | 4/2013 | Beyda |
| 10,573,135 B2 | 2/2020 | Hutchings et al. |
| 2003/0015585 A1 | 1/2003 | Wike et al. |
| 2012/0284132 A1 | 11/2012 | Kim et al. |
| 2013/0132279 A1 | 5/2013 | Nordstrom |
| 2014/0001258 A1 | 1/2014 | Chan et al. |
| 2014/0279119 A1 | 9/2014 | Knoll et al. |
| 2015/0039462 A1 | 2/2015 | Shastry et al. |
| 2016/0200341 A1 * | 7/2016 | Hall ........................ B62B 5/069 280/33.992 |
| 2016/0223339 A1 | 8/2016 | Pellow et al. |
| 2016/0300455 A1 | 10/2016 | Hutchings et al. |
| 2019/0073656 A1 * | 3/2019 | Joseph ............. G06Q 20/40145 |

* cited by examiner

*Primary Examiner* — Ariel J Yu
(74) *Attorney, Agent, or Firm* — Conley Rose, P.C.

(57) ABSTRACT

An interactive shopping system, or smart cart. The system allows a user to select items in a store and complete a purchase without having to wait in lines or interact with store personnel. The system can have a container for holding products selected by at least one user, a user interface, a scanner in communication with the user interface, a processor in communication with the user interface, and a data storage comprising computer instructions executable by the processor. A user can select products, place them within the container, scan the products, and initiate a payment transaction to complete a purchase.

17 Claims, 1 Drawing Sheet

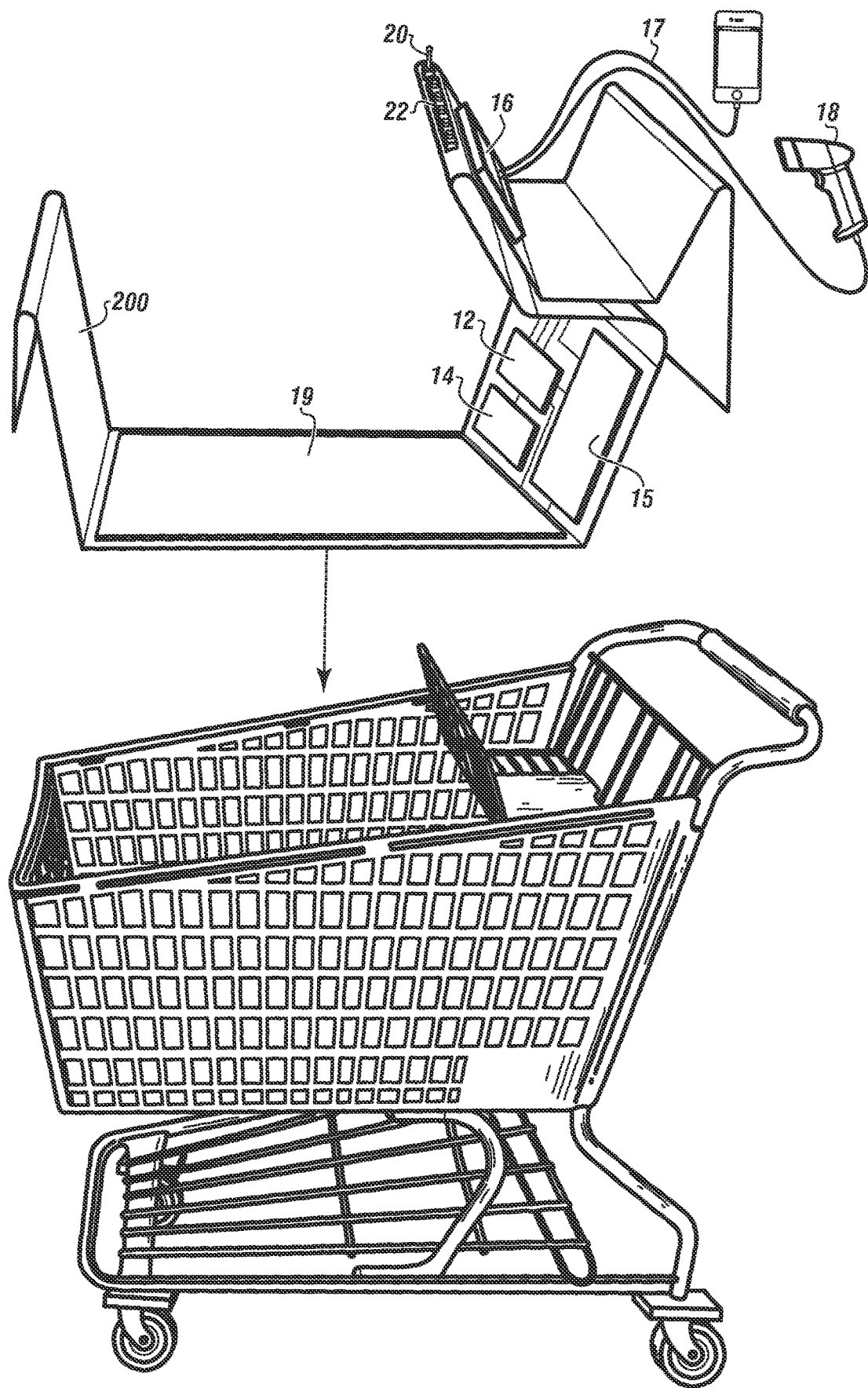

INTERACTIVE SHOPPING SYSTEM AND METHOD

CROSS REFERENCE TO RELATED APPLICATIONS

The present application is a Continuation and claims priority to and the benefit of co-pending U.S. Nonprovisional patent application Ser. No. 17/124,075 filed on Dec. 16, 2020, which is a Continuation in Part of U.S. Nonprovisional patent application Ser. No. 14/952,718 filed on Nov. 25, 2015, issued as U.S. Pat. No. 10,915,936 on Feb. 9, 2021, which is a Continuation in Part of U.S. Nonprovisional patent application Ser. No. 14/714,076 filed on May 15, 2015, issued as U.S. Pat. No. 9,230,249 on Jan. 5, 2016, which claims priority to and the benefit of U.S. Provisional Patent Application Ser. No. 62/139,404 filed on Mar. 27, 2015, all titled "INTERACTIVE SHOPPING SYSTEM AND METHOD". These references are hereby incorporated in their entirety.

FIELD

The current embodiments generally relate to an interactive shopping system.

BACKGROUND

A need exists for an overall improved customer experience at retail stores. Customers desire a faster, frictionless, and more seamless process for making purchases in store.

A further need exists for more efficient security in retail stores. Stores experience significant losses due to theft and a system for monitoring this is desirable.

A further need exists to provide critical user data/information that will allow brick and mortar retail stores to compete with the online stores by providing analytics and user data that currently cannot be tracked and is unavailable for users that walk into retail stores.

The present embodiments meet these needs.

BRIEF DESCRIPTION OF THE DRAWINGS

The detailed description will be better understood in conjunction with the accompanying drawings as follows:

The FIGURE depicts an embodiment of the present disclosure.

The present embodiments are detailed below with reference to the listed FIGURES.

DETAILED DESCRIPTION OF THE EMBODIMENTS

Before explaining the present disclosure in detail, it is to be understood that the disclosure is not limited to the specifics of particular embodiments as described and that it can be practiced, constructed, or carried out in various ways.

While embodiments of the disclosure have been shown and described, modifications thereof can be made by one skilled in the art without departing from the spirit and teachings of the disclosure. The embodiments described herein are exemplary only, and are not intended to be limiting.

Specific structural and functional details disclosed herein are not to be interpreted as limiting, but merely as a basis of the claims and as a representative basis for teaching persons having ordinary skill in the art to variously employ the present embodiments. Many variations and modifications of embodiments disclosed herein are possible and are within the scope of the present disclosure.

Where numerical ranges or limitations are expressly stated, such express ranges or limitations should be understood to include iterative ranges or limitations of like magnitude falling within the expressly stated ranges or limitations.

The use of the word "a" or "an" when used in conjunction with the term "comprising" in the claims and/or the specification may mean "one," but it is also consistent with the meaning of "one or more," "at least one," and "one or more than one."

The word "about", when referring to values, means plus or minus 5% of the stated number.

The use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

When methods are disclosed or discussed, the order of the steps is not intended to be limiting, but merely exemplary unless otherwise stated.

Accordingly, the scope of protection is not limited by the description herein, but is only limited by the claims which follow, encompassing all equivalents of the subject matter of the claims. Each and every claim is hereby incorporated into the specification as an embodiment of the present disclosure. Thus, the claims are a further description and are an addition to the embodiments of the present disclosure.

The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

The current embodiments generally relate to an interactive shopping system. The system may be referred to hereinafter as a smart cart but is not intended to be limiting to any specific embodiment.

Currently, standing in checkout lines at retail stores is time consuming, frustrating, and can negatively affect the customer experience at retail stores.

A benefit of this invention is that the interactive shopping system can save time and provide a more efficient and positive shopping experience.

In embodiments the interactive shopping system comprises a container for holding products selected by at least one user, a user interface, a scanner in communication with a user interface, a processor in communication with the user interface, and a data storage comprising computer instructions executable by the processor.

The container can be a shopping cart, a shopping basket, a shopping bag, or any other item used by persons shopping in a store to hold products intended for purchase.

The user interface can receive or transmit data to the processor and/or data storage.

The user interface may communicate through a physical connection, or wirelessly such as by the use of radio waves, infrared communication, line of sight transmission, and the like.

The user interface can be provided by the retail store or can be the at least one user's personal device, such as cellular phone, a smart phone, a tablet computer, a smart watch, a laptop, a computer, a personal digital assistant, or combinations thereof.

In embodiments, the user interface comprises a display or is in electronic communication with a display for displaying information to a user.

A scale can be provided for weighing produce or confirming that the proper product has been placed within the container after scanning.

The scanner can be in communication with the client device to scan products that the user intends to purchase. The scanner can be capable of reading a universal product code, a shape, a quick response code, a bar code, a picture, or combinations thereof. The scanner can identify products that the user has selected for purchase.

Either simultaneously when scanned or at a specified time, products within the container can be verified to be the products that have been scanned for purchase. Components of the system such as the scanner, a camera, the scale, or the like can be utilized for verification. Elements such as size, weight, packaging, and the like can be monitored to determine products within the container.

In embodiments, the scanner can have a first and second mode of operation. The scanner can have a first mode of operation in which the user scans the item using the scanner before placing the item in the container, or a second mode of operation in which the user places the item in the container before scanning. These first and second modes of operation may be used interchangeably during a shopping transaction.

The user interface may indicate or display a request for the user to scan the item and may send a warning if the user does not scan the item in a prescribed period of time to protect against shoplifting, i.e., not paying for all items in the container. The warning can be a visual or audible indication, a message sent to store personnel, and the like.

The processor can be any electronic circuitry such as a processor or a microprocessor capable of carrying out the instructions of a computer program. The data storage can be any computer readable medium capable of storing data in a non-transitory fashion. The data storage excludes any transitory signals but can include any non-transitory data storage circuitry, such as buffers, cache, and queues, within transceivers of transitory signals.

The processor can be in communication with a data storage configured to bi-directionally communicate with a network, and further in communication with a store administrative processor and a store administrative data storage having a store library comprising product information. In embodiments, a library comprising product information can reside on the data storage and be synchronized at regular time periods, thereby eliminating the need to communicate with the store library.

The data storage or the store administrative data storage can have computer instructions instructing the processor or the store administrative processor to match scanned products with the product information, retrieve the product information as requested by the at least one user, and communicate with the user interface to display the product information or initiate a payment transaction.

In embodiments, the display or the display screen can be touch activated.

Product information can include product specifications, product pricing, and other pertinent information as required by a store or the user. Product specifications can include weight, nutritional information, size of container, packaging description, or any other information used to identify the product.

The system can comprise a visual or audible indicator for determining when a product has been selected for purchase by the user. The indicator can be configured by persons having ordinary skill in the art to signal to a user that an object has been scanned or removed from the container.

The interactive shopping system can include a point of sale system, which can be installed on or in the container. The point of sale system can be in communication with a corresponding mobile application, which can provide payment for the products in the rolling cart or basket, eliminating the need to have to wait in checkout lines.

The interactive shopping system can use a removable sleeve, which can be easily and quickly connected or disconnected to the container. In embodiments, the removable sleeve can be a sheet, such as a plastic cover.

The interactive shopping system can use a store library, which can be located in the store administrative data storage. The store library can contain product prices associated with product weights for products being sold in the store as well as product specifications.

The FIGURE depicts the interactive shopping system according to one or more embodiments.

In this embodiment, a sleeve 200 can cover the container in one or more embodiments. The interactive shopping system can make use of such a sleeve to convert existing carts to a smart cart in embodiments.

The container can have a scanner 18 and a scale 19 connected to the processor 12 and a power supply 15. The scanner can be any scanner known to persons having ordinary skill in the art, such as a laser, a camera, and the like. The scanner can identify products by matching the appearance to a library of photos, or by scanning and matching an identification code, such as a UPC code, QR code, ISBN code, and the like.

The processor 12 can be in communication with a data storage 14, wherein the processor can be configured to bi-directionally communicate with the network. As discussed before, product information, specifications, weight, pricing, and the like can be stored on a local data storage and synchronized with a master database or retrieved from a central repository in real time.

A user interface 16 is shown connected to the processor 12 and the power supply 15. The user interface can be provided by the store and a part of the smart cart or can be a client device. The user interface can provide useful information to a user, such as a running total of purchases, nutritional information, weights, a map of the store, a location of a desired item, and the like.

Optionally, a client device connector 17 is shown in communication with the processor 12 for syncing the processor 12 with a client device. In embodiments, a wireless communication can also be utilized.

A speaker 20 can provide an audible indication to the user for actions such as scanning items, errors, warnings, and the like to the user or store personnel.

A visual indicator 22, such as a light array is shown mounted to the sleeve 200, wherein the light array can be connected to the processor 12 and the power supply 15. The visual indicator 22 can be configured by persons having ordinary skill in the art to deliver information to the user or store personnel.

While these embodiments have been described with emphasis on the embodiments, it should be understood that within the scope of the appended claims, the embodiments might be practiced other than as specifically described herein.

What is claimed is:

1. A shopping system comprising:
   a container comprising:
      a basket defining a longitudinal dimension and a width dimension; and
      a plurality of wheels; and
   a removable sleeve attached to a plurality of electronic components, the electronic components comprising:
      a scanner for scanning objects or object codes and transmitting an output signal;
      a processor for receiving and transmitting electronic signals;
      a display screen in communication with the processor;
      a light array having at least one light emitting diode; and
      a power source for supplying power to the processor, the display screen, the scanner, or the light array;
      wherein the removable sleeve is connected to the container to cover a portion of the container such that the electronic components and the removable sleeve itself are together connected to the container to convert the container to a smart cart, and the removable sleeve and the attached electronic components are together disconnectable from the container and connectable to another container to convert said another container to a smart cart.

2. The shopping system of claim 1, further comprising a support coupled to the basket, wherein the support extends at an angle relative to the removable sleeve and is configured to couple the removable sleeve to the baseket.

3. The shopping system of claim 2, wherein the support is formed from a washable non-porous material that is coupled to the basket and that extends across the width of the basket.

4. The shopping system of claim 2, wherein the processor is supported by the support, wherein the processor receives output signals from the scanner and provides signals to the display screen and the light array and wherein the processor is controlled:
   to cause the light array to produce different color outputs to provide different visual cues regarding the status of the shopping system;
   to cause the display screen to display a subtotal for the scanned products in the form of a calculated total of the prices for the scanned products, said calculated total adjusted each time a new scanned product is placed in the basket; and
   to communicate with a payment system to initiate payment transfers electronically with a financial institution to pay for products in the basket.

5. The shopping system of claim 4, wherein the payment system is application based.

6. The shopping system of claim 4, wherein the payment system is initiated through a shopping store system.

7. The shopping system of claim 1 wherein the removable sleeve is a sheet.

8. The shopping system of claim 1 wherein the removable sleeve is a plastic cover.

9. The shopping system of claim 1 wherein the removable sleeve is a sheet.

10. The shopping system of claim 1 wherein the removable sleeve is a plastic cover.

11. The shopping system of claim 1 wherein the removable sleeve is a sheet.

12. The shopping system of claim 1 wherein the removable sleeve is a plastic cover.

13. A shopping system comprising:
   a basket defining a longitudinal dimension and a width dimension;
   a removable sleeve;
   a support coupled to the basket and configured to couple the removable sleeve to the basket, wherein the support extends at an angle relative to the removable sleeve; and
   a plurality of wheels;
   wherein the removable sleeve comprises a plurality of attached electronic components, the attached electronic components comprising:
      a display screen;
      a light array having at least one light emitting diode;
      a processor in communication with the display screen wherein the processor receives output signals from a scanner and provides signals to the display screen and the light array, and wherein the processor is controlled:
         to cause the light array to produce different color outputs to provide different visual cues regarding the status the shopping system, wherein a visual cue is provided by the light array when an item is placed in the basket without being scanned;
         to cause the display screen to display a subtotal for the scanned products in the form of a calculated total of the prices for the scanned products, said calculated total adjusted each time a new scanned product is placed in the basket; and
         to communicate with a payment system to initiate payment transfers electronically with a financial institution to pay for products in the basket; and
      a power source, wherein the power source is in electronic communication with and supplies power to the electronic components
   wherein the removable sleeve is connected to the container to cover a portion of the basket such that the electronic components and the removable sleeve are together connected to the container to convert the container to a smart cart, and the removable sleeve and the attached electronic components are together disconnectable from the basket and connectable to another container to convert said another basket to a smart cart.

14. The shopping system of claim 13, wherein the support is formed from a washable non-porous material that is coupled to the basket and that extends across the width of the basket.

15. The shopping system of claim 13, wherein the payment system is application based.

16. The shopping system of claim 13, wherein the payment system is initiated through a store system.

17. A shopping system comprising:
   a removable sleeve configured to be connected to a shopping cart with wheels such that the removable sleeve covers a portion of the shopping cart, wherein the removable sleeve is disconnectable from the shopping cart and connectable to another shopping cart; and
   a plurality of electronic components attached to the removable sleeve, the attached electronic components comprising:
      a scanner for scanning objects or object codes and transmitting an output signal;
      a processor for receiving and transmitting electronic signals;
      a display screen in communication with the processor;

a light array having at least one light emitting diode; and a power source for supplying power to the processor, the display screen, the scanner, or the light array;

wherein the removable sleeve is connectable to the shopping cart such that the attached electronic components and the removable sleeve itself are together connectable to the shopping cart to convert the shopping cart to a smart cart, and the removable sleeve and the attached electronic components are together disconnectable from the shopping cart and connectable to another shopping cart to convert said another shopping cart to a smart cart.

* * * * *